US005501424A

United States Patent [19]
Williams et al.

[11] Patent Number: 5,501,424
[45] Date of Patent: Mar. 26, 1996

[54] WIRE CUTTING INSERT FOR GATE VALVE

[75] Inventors: Michael R. Williams; Matthew W. Long, both of Houston, Tex.

[73] Assignee: FMC Corp, Chicago, Ill.

[21] Appl. No.: 194,085

[22] Filed: Feb. 9, 1994

[51] Int. Cl.⁶ .................................................. E21B 33/06
[52] U.S. Cl. .............................. 251/1.3; 251/326
[58] Field of Search ............................. 251/1.3, 326, 327

[56] References Cited

U.S. PATENT DOCUMENTS 4,997,162   3/1991   Bober et al. ............................. 251/327

Primary Examiner—John C. Fox

[57] ABSTRACT

A gate valve assembly for controlling fluid flow is provided with wireline-cutting inserts loose-fitted in either of, or both of, the gate opening and at least one of the seats. Each insert has a length that prohibits it from extending beyond the opening in which it is received so that the contact surface between the gate and an adjacent seat forms a continuous seal and the inserts serve only a wireline-cutting function, thus eliminating the possibility of sealing surfaces being damaged by wireline-cutting.

39 Claims, 6 Drawing Sheets

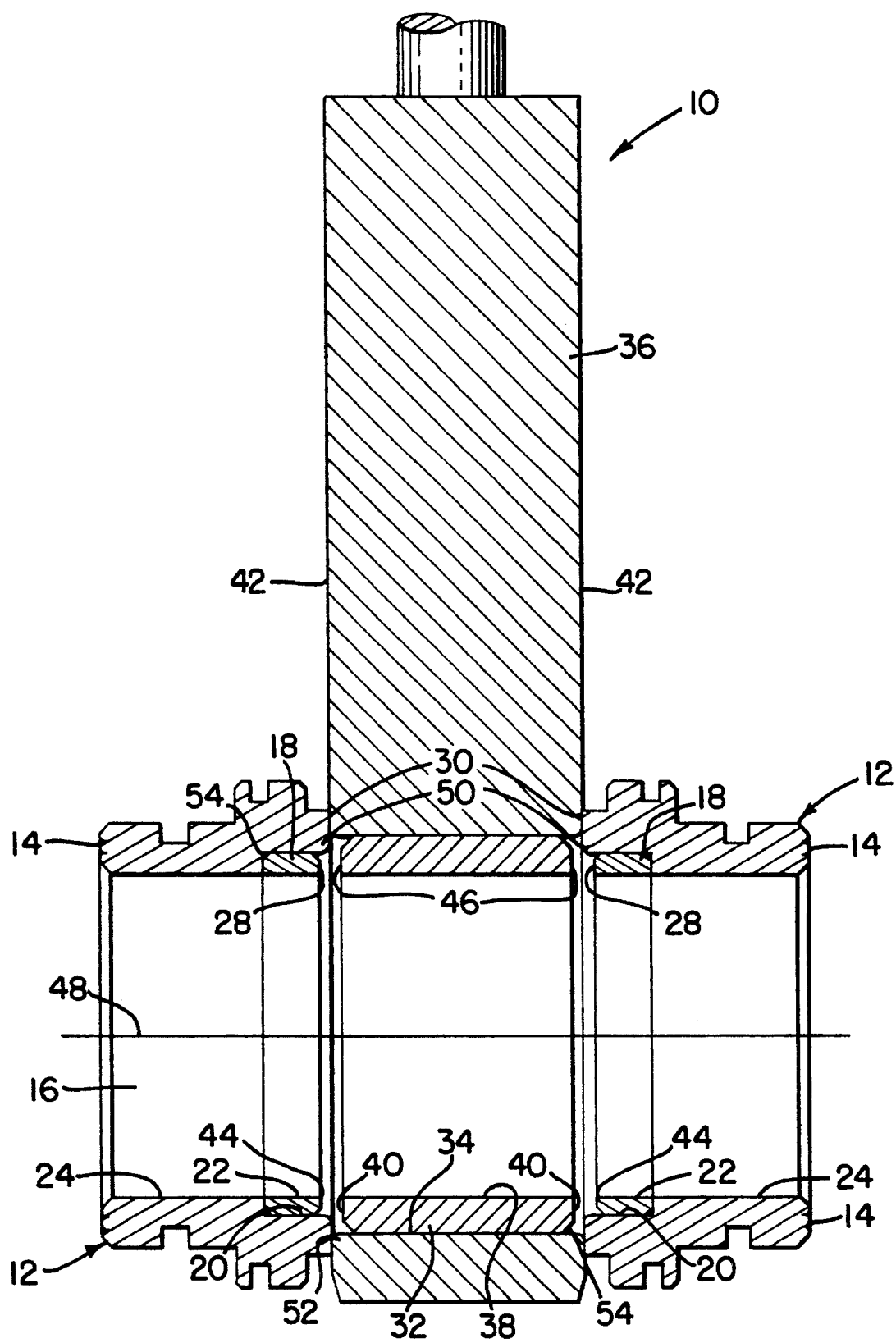
FIG_1

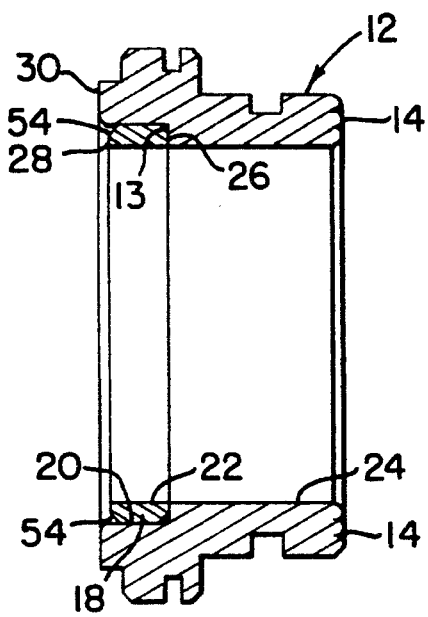
FIG_2
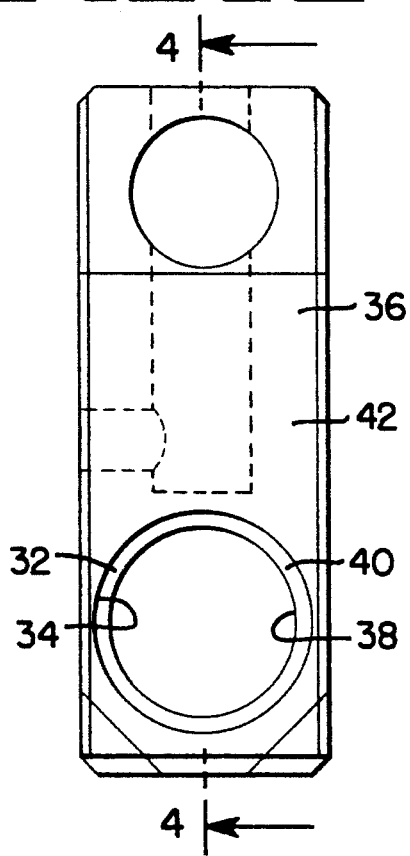
FIG_3
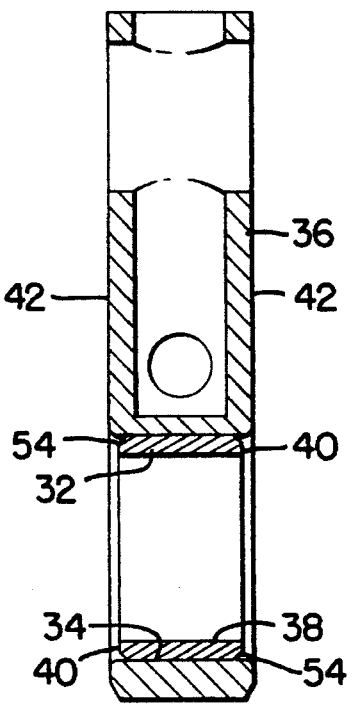
FIG_4

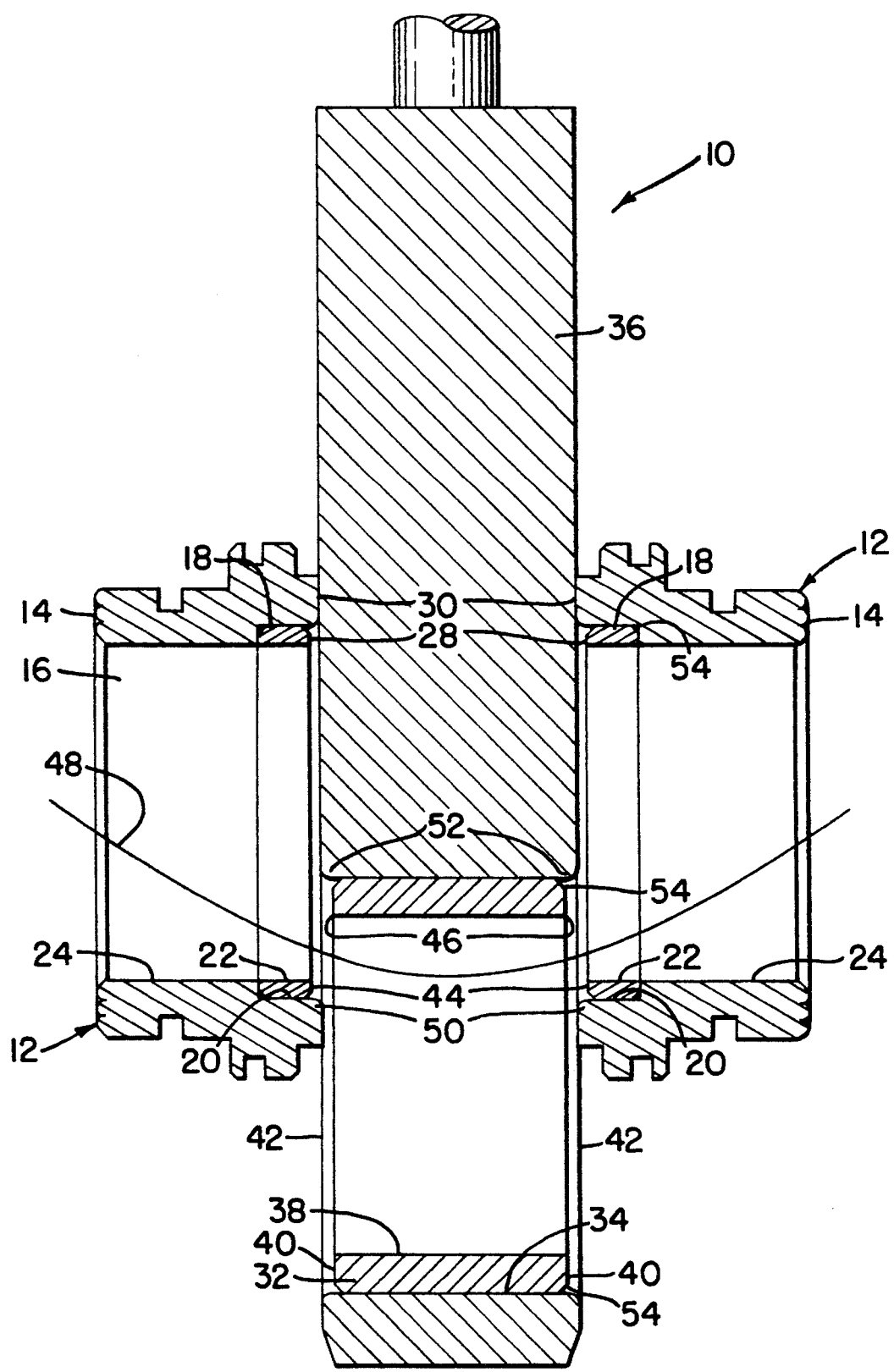
FIG_5

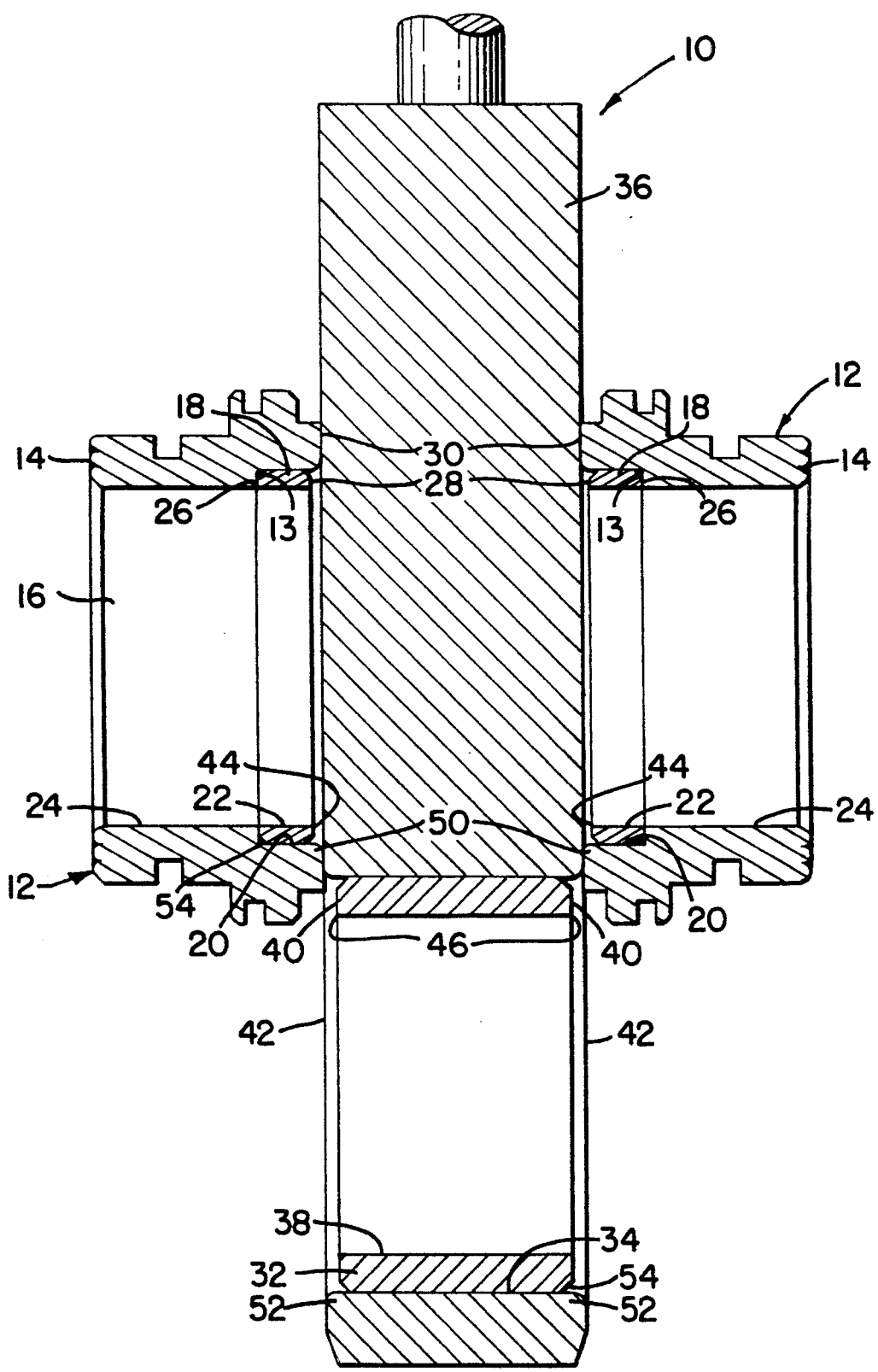
FIG_6

FIG_7
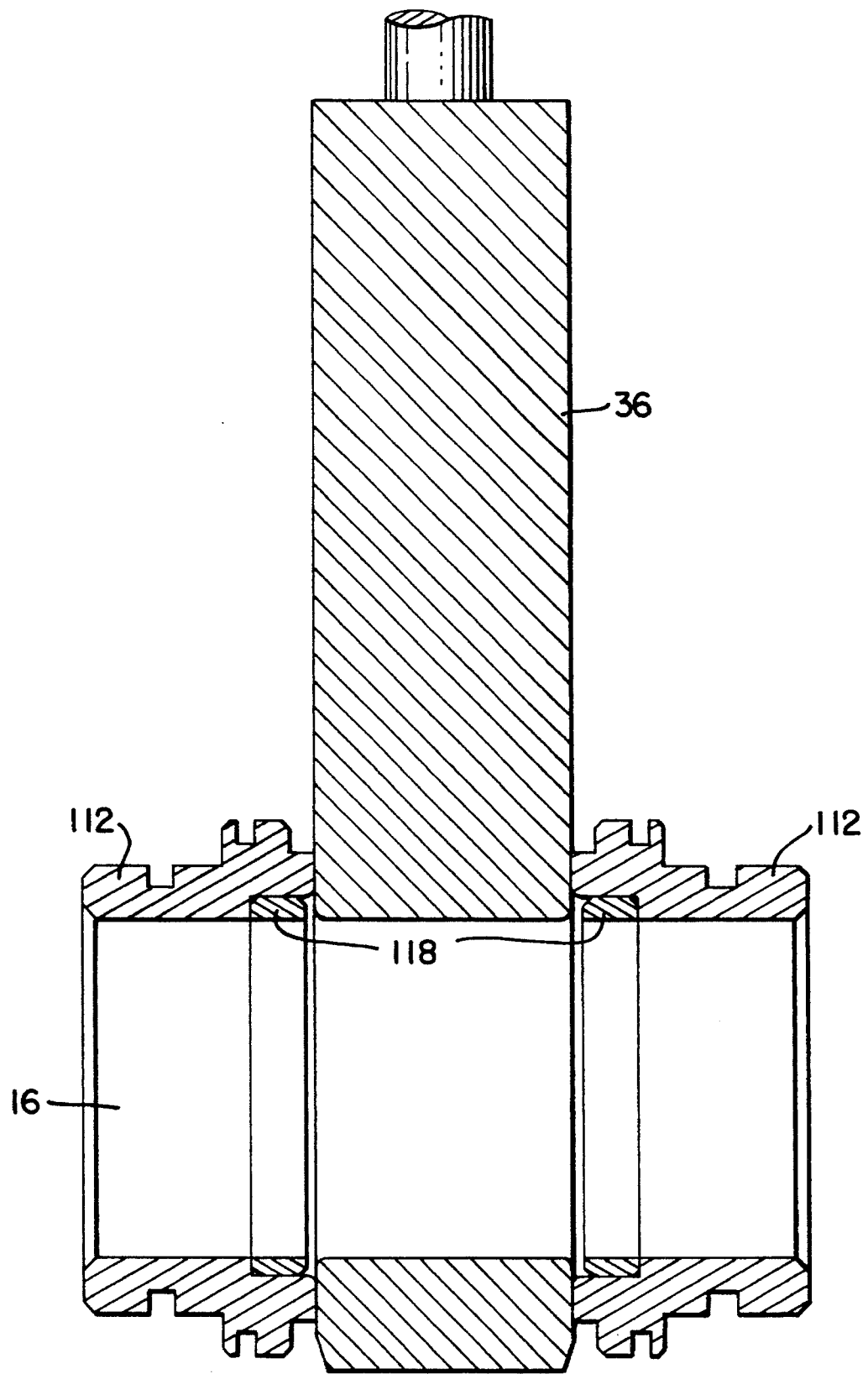

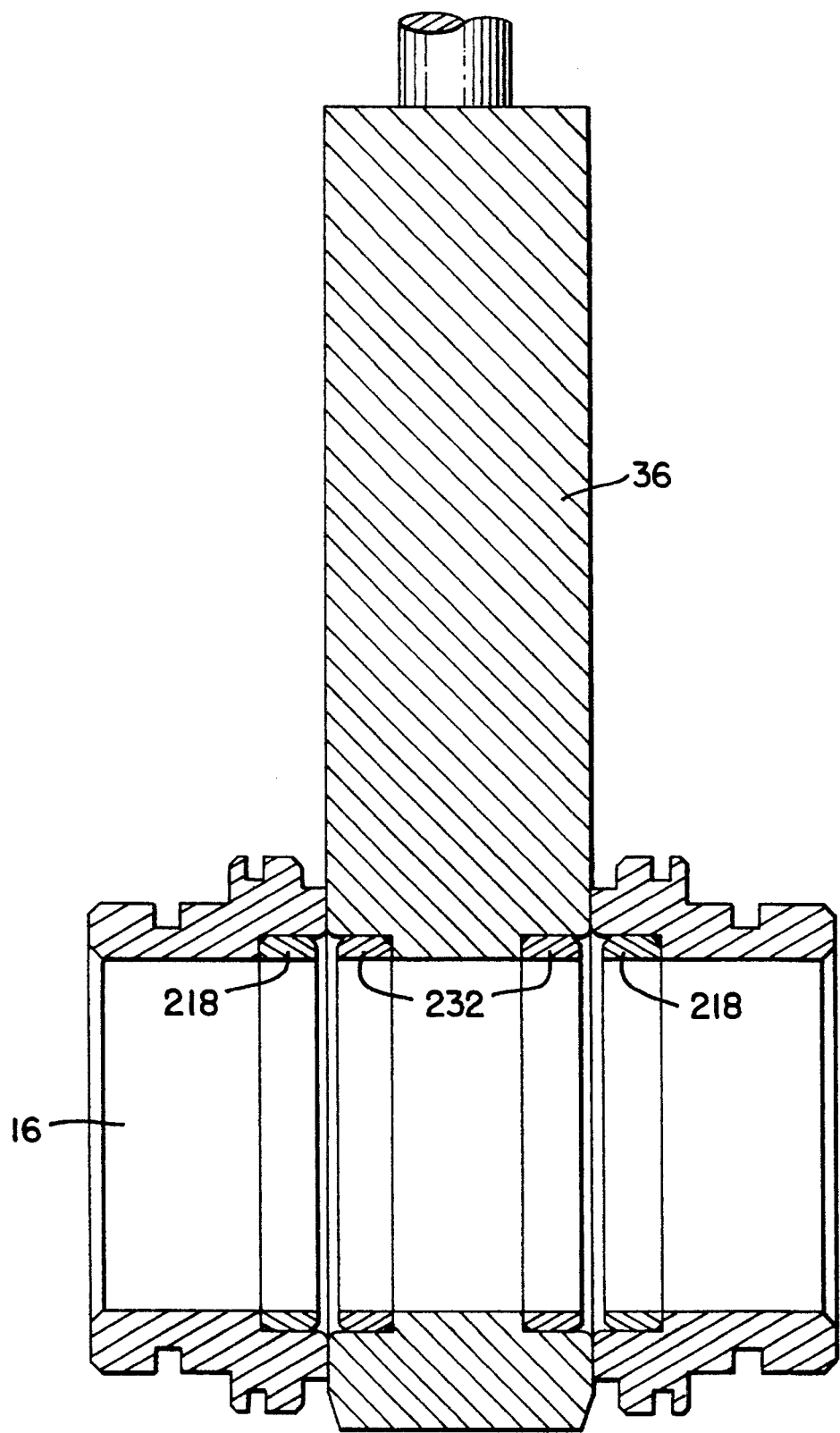
FIG_8

WIRE CUTTING INSERT FOR GATE VALVE

BACKGROUND OF THE INVENTION

This invention relates to gate valves and, more particularly, to inserts used in gates or seats of gate valves for cutting wireline or tubing run through the valve flow path.

Gate valves are used to shut off or open a pressurized fluid flow path. Gate valves are typically comprised of a valve body having a valve chamber therein with an inlet port and outlet port, and a linearly moveable gate or slab having a through hole which when aligned with the inlet and outlet ports forms a flow path. The gate is moved linearly to open and close the flow path. Usually, one or more ring-shaped seat components are positioned on either side of the gate and around the flow path to form seals between the gate and the valve body.

Gate valves are commonly used in various oil or gas well operations. During operations which require the use of a wireline or tubing tool run through the well, there is the need for a mechanism that is capable of shearing the wireline or tubing under certain circumstances. To accomplish this, known gate valves have been designed to have shearing surfaces on the inner circumferential edges of either the gate or seat flow passage so that when the gate is moved from an opened position to a closed position, the wireline is sheared by these shearing surfaces. As a result of such shearing, the gate and seat surfaces can become damaged and ineffective as sealing surfaces. Replacement of such damaged parts is often expensive and disruptive to well operations.

Known valves designed to address the aforementioned problems have included the use of hardened inserts in either the gate or seats, or both. Even with the use of hardened inserts, some damage from wireline shearing still occurs and adversely affects the sealing capability of the components. Further drawbacks to such designs include the need to press-fit or otherwise hold gate inserts in place to prevent them from sliding out of place when the gate is in the closed position.

Another known design that attempts to solve the aforementioned problems includes the use of high strength, high hardness hardfacings on gates and seats for withstanding the high stress concentrations that occur during wireline cutting. Such hardfacings are usually expensive and often do not prevent deformation at the location of the cut and are subject to flaking or scratching, often resulting in leakage. When this occurs, replacement of the gate and seats is necessary and expensive.

There is a need, therefore, for a gate valve design that is capable of cutting a wireline or tubing, that is capable of maintaining a seal after cutting, and that is economical and practical.

SUMMARY OF THE INVENTION

The present invention involves a gate valve design that has one or more high strength wireline-cutting inserts loose-fitted in at least one of the gate or seats, wherein the insert cutting surfaces are recessed from sealing surfaces of the gate or seat in which the insert is received so that sealing surfaces are separate from cutting surfaces and, therefore, not subject to damage resulting from cutting operations. The present invention eliminates the problem of leakage from seals damaged by cutting operations and provides wireline-cutting inserts that are relatively easy and inexpensive to replace compared to gates and seats.

BRIEF DESCRIPTION OF THE DRAWINGS

FIG. 1 is a sectional view of a first embodiment of a valve gate and seat assembly in an opened position.

FIG. 2 is a sectional view of a seat and insert of the type shown in FIG. 1.

FIG. 3 is a side view of the gate and insert as shown in FIG. 1.

FIG. 4 is a view of section A—A of FIG. 3.

FIG. 5 is a sectional view of the valve gate and seat assembly of FIG. 1 shown in a transition mode between an opened and closed position.

FIG. 6 is a sectional view of the valve gate and seat assembly of FIG. 1 shown in a closed position.

FIG. 7 is a sectional view of a second embodiment of a valve gate and seat assembly in an opened position.

FIG. 8 is a sectional view of a third embodiment of a valve gate and seat assembly in an opened position.

DESCRIPTION OF THE PREFERRED EMBODIMENTS

A first embodiment of a valve gate assembly 10 is shown in an opened flow position in FIG. 1. The assembly 10 is housed in the valve cavity (not shown) of a conventional gate valve (not shown). The assembly includes seats 12 that are in sealing contact with the inner surface of conventional seat pockets (not shown) in the valve cavity at ends 14 and aligned with the inlet and outlet ports to form a flow path 16 therethrough. A wireline-cutting seat insert 18 is loose-fitted in an insert pocket 20 of each seat 14 such that the inner diameter 22 of the seat insert 18 is generally flush with the inner diameter 24 of the seat 12 forming part of the flow path 16. The outer end 26 of each seat insert 18 is in close proximity to a surface 13 of the seat 12 to which it is adjacent. The inner end 28 of each seat insert 18 is slightly recessed from the inner end 30 of the seat 14 as shown in FIG. 2. A wireline-cutting gate insert 32 is loose-fitted in a central opening 34 of a gate 36 as shown in FIGS. 1 and 3 such that the inner diameter 38 of the gate insert 32 is generally flush with the inner diameter 22 of the seat insert 18. The length of the gate insert 32 is less than the thickness of the gate 36 such that the ends 40 of the gate insert are effectively recessed from the sides 42 of the gate 36 as shown in FIG. 4. Because the ends 40 of the gate insert 32 and the inner ends 28 of each seat insert 18 are recessed as described above, the inner ends 30 of the seats 12 and the sides 42 of the gate 36 form sealing surfaces that engage in sealing contact sealing the flow path 16.

The seat inserts 18 each have a wireline-cutting surface 44 formed at the intersection of the inner circumference and the inner end 28. The gate insert 32 has a wireline-cutting surface 46 formed at the intersection of the inner circumference and either end 40. FIGS. 5 and 6 illustrate the relative movement of the gate 36 with respect to the seats 12 when the gate 36 is moved from the opened position of FIG. 1 to the fully closed position of FIG. 6. When the gate 36 is moved from the opened position to the closed position, a wireline or tubing 48 run through the flow path 16 is sheared or cut upon closing of the gate 36 by the wireline-cutting surfaces 44 and 46 of the seat inserts and gate insert, respectively.

The seat inserts 18 and gate insert 32 can be made from any material of sufficient strength and hardness to cut a wireline or tubing. In the preferred embodiment a hardened alloy, such as a cobalt-based alloy, having a hardness of approximately 50 to 60 HRC or greater is used.

Among the advantages of providing for recessed ends 28, 40 of the seat inserts 18 and the gate insert 32 is that the inner ends 30 of the seats 12 and the sides 42 of the gate extend past their respective insert ends 28, 40 to form a seal so that the insert ends 28, 40 function only as cutting surfaces 44, 46. Since the cutting surfaces 44, 46 are generally concentrically enclosed within a continuous seal formed by the seat ends 30 and the gate sides 42, the only resultant wireline-cutting damage that may occur will affect only the insert cutting surfaces 44, 46 and not the continuous seal. Thus, an effective seal can be reliably maintained even after wireline-cutting. Since the gate 36 and seats 12 do not function as wireline-cutting devices, they can be made of less expensive materials than those used in other gate designs where they would be required to perform cutting functions. Furthermore, it is preferable to provide relatively rounded edges 50, 52 at the inner circumference of the seats 12 and gate central opening 34 to enable these edges to smoothly pass against each other without damaging each other when the gate 36 is moved between open and closed positions. Such damage occurs when seats and gates have relatively sharp edges or hardfacings. Such rounded edges generally are not as effective for wireline cutting or shearing as relatively square edges. Because the seat ends 30 and gate sides 42 of the preferred embodiment are recessed and will not pass against each other during gate movement, the insert cutting edges 44, 46 may be made relatively square for more effective cutting.

As illustrated in FIGS. 1, 5 and 6, the loose-fitted inserts 18, 32 are prevented from slipping out of position by the geometry of the valve assembly 10. The seat inserts 18 are held in place by the gate insert 32 on one side and the seat surface 13 on the other while the gate 36 is in the opened position of FIG. 1. When the gate 36 is moved to a partially closed position as in FIG. 5 and a fully closed position as in FIG. 6, the seat inserts 18 are held in place by the seat surface 13 and the gate 36. Similarly, the gate insert 32 is held in place by the seat 12 or inserts 18, depending on the thickness of the gate insert 32, when the gate 36 is in the opened position of FIG. 1, and by the seats 12 when the gate 36 is in the partially and fully closed positions of FIGS. 5 and 6. The loose fit of the inserts 18, 32 provides for easy separation and replacement of the inserts, rather than replacement of entire gates and seats or replacement of press-fitted or otherwise fixed inserts, reducing maintenance costs and eliminating manufacturing and servicing steps. The outer circumferential edges of the inserts 18, 32 can be provided with chamfered edges 54 to provide for easy insertion into the seat 12 or gate 36. The chamfers may be located on both ends so that there is no need to distinguish "front" and "rear" ends and to enable more uniformity in manufacture.

A second embodiment of the invention is illustrated in FIG. 7 which is essentially the same as the embodiment in FIG. 1 except that only the seats 112 are provided with inserts 118. Such an embodiment could be utilized when, depending on factors including the relative hardness and dimensions of the wireline to be cut and gate components, such an assembly could cut the wireline with little or no risk of leakage, or at otherwise acceptable expense.

A third embodiment illustrated in FIG. 8 is essentially the same as the embodiment in FIG. 1 except that two gate inserts 232 of similar dimensions and material as the seat inserts 218 are utilized rather than one gate insert. The gate inserts 232 are seated and held in place in the gate similarly to the seat inserts 18 seated in seats 12 of the embodiment in FIG. 1. Among the advantages of this embodiment is that the four inserts can be uniformly manufactured and quickly installed in any of two seat and two gate locations without the need to distinguish any one from the others.

While the embodiments illustrated in FIGS. 1, 7 and 8 show a seat insert in each seat, it is possible to provide only one seat with a seat insert as needed. Likewise, in the embodiment of FIG. 8, it may be only necessary or desirable to provide one gate insert. While the preferred embodiments of the present invention have been herein described, it is understood that modifications and variations can be made without departing from what is regarded as the scope and spirit of the present invention.

We claim:

1. A valve seat and gate assembly for use in a gate valve, said assembly comprising a valve body having a valve chamber therein;

a valve inlet and a valve outlet in communication with said valve chamber;

a valve gate housed in said valve chamber and arranged to move reciprocally therein in a generally vertical direction between a flow position and a stop flow position, said valve gate having a central opening;

a generally horizontal flow path defined by said valve inlet, said valve outlet, and said central opening when said valve gate is in said flow position;

a pair of generally ring-shaped valve seats each received in a seat pocket in said valve body on one side of said valve gate and each positioned concentrically around said valve inlet and said valve outlet, respectively, forming part of said flow path, each said valve seat adapted to sealingly engage said valve gate;

at least one generally ring-shaped wire-cutting seat insert for cutting wireline or tubing run through said valve in said flow path, said seat insert being received in an insert pocket in one of said valve seats and positioned concentrically around either said valve inlet or said valve outlet, said seat insert having a central opening forming a wire-cutting surface along inner circumferential edge of said central opening located at an end of said insert located adjacent to said valve gate, whereby when said valve gate is moved from said flow position to said stop-flow position, said wireline is sheared between the wire-cutting surface of said seat insert and paid inner circumferential edge of said central opening;

each said valve seat has a seat outer end in contact with said valve body and a seat inner end forming a generally vertical first plane adapted to sealingly engage said valve gate;

said seat insert has an axial length less than an axial length of said insert pocket such that when said insert is received in said insert pocket, said wire-cutting surface does not contact said valve gate.

2. A valve seat and gate assembly according to claim 1, wherein said seat insert is loose-fitted in said insert pocket.

3. A valve seat and gate assembly according to claim 2, wherein said seat insert has an outer diameter which is greater than the inside diameter of the gate central opening whereby said seat insert is prevented from moving out of said insert pocket when said gate is in a flow position.

4. A valve seat and gate assembly according to claim 1, wherein said wire-cutting surface of said seat insert has, in profile, a substantially square edge.

5. A valve seat and gate assembly according to claim 1, wherein said seat insert is comprised of a hardened alloy having a hardness of approximately 50 HRC or greater.

6. A valve seat and gate assembly according to claim 1, wherein said seat insert is comprised of a hardened alloy having a hardness of approximately 50 to 60 HRC.

7. A valve seat and gate assembly according to claim 1, wherein said seat insert is comprised of a cobalt-based alloy.

8. A valve seat and gate assembly according to claim 1, wherein said seat insert is chamfered at both ends at its outer circumferential edges.

9. A valve seat and gate assembly for use in a gate valve, said assembly comprising a valve body having a valve chamber therein;

a valve inlet and a valve outlet in communication with said valve chamber;

a valve gate housed in said valve chamber and arranged to move reciprocally therein in a generally vertical direction between a flow position and a stop flow position, said valve gate having a central opening and a horizontal width, a generally ring-shaped gate insert having a central opening therethrough and received within said gate central opening for cutting a wireline or tubing run through said valve in said flow path, said gate insert being positioned in alignment with said valve inlet and said gate is in said flow position, said gate insert having a wire-cutting surface formed by an inner circumferential edge at either end of said gate insert;

a pair of generally ring-shaped valve seats each received in a seat pocket in said valve body on one side of said valve gate and each positioned concentrically around said valve inlet and said valve outlet, respectively, forming part of said flow path, each said valve seat adapted to sealingly engage said valve gate;

at least one generally ring-shaped wire-cutting seat insert for cutting wireline or tubing run through said valve in said flow path, said seat insert being received in an inset pocket in one of said valve seats and positioned concentrically around either said valve inlet or said valve outlet, said seat insert having a central opening forming a wire-cutting surface along an inner circumferential edge of said central opening of said seat insert, whereby when said valve gate is moved from said flow position to said stop flow position, said wireline is sheared between the respective wire-cutting surfaces of said seat insert and said gate insert;

each said valve seat has a seat outer end in contact with said valve body and a seat inner end forming a generally vertical first plane adapted to sealingly engage said valve gate;

said seat insert has an axial length such that when said insert is received in said pocket, said wire-cutting surface is located opposite said valve gate with respect to said first plane;

said gate insert has an axial length that is less than the horizontal width of said gate, and said gate insert is positioned in said gate central opening such that each end of said gate insert lays between and is spaced from two generally vertical planes formed by respective vertical sides of said valve gate.

10. A valve seat and gate assembly according to claim 9, wherein said gate insert is loose-fitted in said gate central opening; and said valve insert is loose-fitted in said insert pocket.

11. A valve seat and gate assembly according to claim 9, wherein said gate insert has an outer diameter which is greater than the inner diameter of each of said valve seats whereby said gate insert is prevented from moving out of said gate central opening when said gate is in a flow position; and said seat insert has an outer diameter which is greater than the inside diameter of the gate insert whereby said seat insert is prevented from moving out of said insert pocket when said gate is in a flow position.

12. A valve seat and gate assembly according to claim 9, wherein said wire-cutting surfaces of said seat insert and said gate insert each have, in profile, a substantially square edge.

13. A valve seat and gate assembly according to claim 9, wherein said seat insert and said gate insert are each comprised of a hardened alloy having a hardness of approximately 50 HRC or greater.

14. A valve seat and gate assembly according to claim 9, wherein said seat insert and said gate insert are each comprised of a hardened alloy having a hardness of approximately 50 to 60 HRC.

15. A valve seat and gate assembly according to claim 9, wherein said seat insert and said gate insert are each comprised of a cobalt-based alloy.

16. A valve seat and gate assembly according to claim 9, wherein said seat insert is chamfered at both ends at its circumferential edges; and said gate insert is chamfered at both ends at its outer circumferential edges.

17. A valve seat and gate assembly for use in a gate valve said assembly comprising a valve body having a valve chamber therein;

a valve inlet and a valve outlet in communication with said valve chamber;

a valve gate housed in said valve chamber and arranged to move reciprocally therein in a generally vertical direction between a flow position and a stop flow position, said valve gate having a central opening;

a pair of generally ring-shaped valve seats each received in a seat pocket in said valve body on one side of said valve gate and each positioned concentrically around said valve inlet and said valve outlet respectively, at least one of said valve seats having a central opening forming a wire-cutting surface along its inner circumferential edge each said valve seat adapted to sealingly engage said valve gate;

a generally ring-shaped gate insert having a central opening therethrough and received within said gate central opening for cutting wireline or tubing run through said valve in said flow path, said gate insert being positioned in alignment with said valve inlet and said valve outlet, thereby defining a generally horizontal flow path when said gate is in said flow position, said gate insert having a wire-cutting surface formed by an inner circumferential edge at either end of said gate insert, whereby widen said gate is moved from said flow position to said stop-flow position, said wireline is sheared between the respective wire-cutting surfaces of said gate insert and said valve seat;

each said valve seat has an outer end in close proximity to said valve body and an inner end forming a generally vertical first plane adapted to sealingly engage said valve gate;

said gate insert has an axial length that is less than the horizontal width of said gate and said gate insert is positioned in said gate central opening such that each end of said gate insert lays between two generally vertical planes formed by respective vertical sides of said valve gate.

18. A valve seat and gate assembly according to claim 17, wherein said gate insert is loose-fitted in said gate central opening.

19. A valve seat and gate assembly according to claim 17, wherein said gate insert has an outer diameter which is greater than the inner diameter of each of said valve seats whereby said gate insert is prevented from moving out of said gate central opening when said gate is in a flow position.

20. A valve seat and gate assembly according to claim 17, wherein said wire-cutting surface of said gate insert has, in profile, a substantially square edge.

21. A valve seat and gate assembly according to claim 17, wherein said gate insert is comprised of a hardened alloy having a hardness of approximately 50 HRC or greater.

22. A valve seat and gate assembly according to claim 17, wherein said gate insert is comprised of a hardened alloy having a hardness of approximately 50 to 60 HRC.

23. A valve seat and gate assembly according to claim 17, wherein said gate insert is comprised of a cobalt-based alloy.

24. A valve seat and gate assembly according to claim 17, wherein said gate insert is chamfered at both ends at its outer circumferential edges.

25. A valve seat and gate assembly for use in a gate valve, said assembly comprising a valve body having a valve chamber therein;

a valve inlet and a valve outlet in communication with said valve chamber;

a valve gate housed in said valve chamber and arranged to move reciprocally therein in a generally vertical direction between a flow position and a stop flow position, said valve gate having a central opening;

a pair of generally ring-shaped valve seats each received in a seat pocket in said valve body on one side of said valve gate and each positioned concentrically around said valve inlet and said valve outlet, respectively, at least one of said valve seats having a central opening forming a wire-cutting surface along its inner circumferential edge ,each said valve seat adapted to sealingly engage said valve gate;

at least one generally ring-shaped gate insert having a central opening therethrough and received within and contacting a generally vertical surface of an annular recess in said gate central opening, said gate insert for cutting wireline or tubing run through said valve in said flow path, said gate insert being positioned in alignment with said valve inlet and said valve outlet, thereby defining a generally horizontal flow path when said gate is in said flow position, said at least one gate insert having a wire-cutting surface formed by an inner circumferential edge, whereby when said gate is moved from said flow position to said stop-flow position, said wireline is sheared between the respective wire-cutting surfaces of said gate insert and said at valve seat;

each said valve seat has an outer end in close proximity to said valve body and an inner end forming a generally vertical first plane adapted to sealingly engage said valve gate;

said gate insert has an axial length that is less than the distance between the generally vertical surface of said recess and a generally vertical plane formed by a vertical side of said gate on which said recess is formed such that the second end of said gate insert is located between said vertical surface and said generally vertical plane.

26. A valve seat and gate assembly according to claim 25, wherein said gate insert is loose-fitted in said annular recess in said gate central opening.

27. A valve seat and gate assembly according to claim 25, wherein said gate insert has an outer diameter which is greater than the inner diameter of each of said valve seats whereby said gate insert is prevented from moving out of said annular recess in said gate central opening when said gate is in a flow position.

28. A valve seat and gate assembly according to claim 25, wherein said wire-cutting surface of said at least one gate insert has, in profile, a substantially square edge.

29. A valve seat and gate assembly according to claim 25, wherein said at least one gate insert is comprised of a hardened alloy having a hardness of approximately 50 HRC or greater.

30. A valve seat and gate assembly according to claim 25, wherein said at least one gate insert is comprised of a hardened alloy having a hardness of approximately 50 to 60 HRC.

31. A valve seat and gate assembly according to claim 25, wherein said at least one gate insert is comprised of a cobalt-based alloy.

32. A valve seat and gate assembly according to claim 25, wherein said gate insert is chamfered at its circumferential edges.

33. A valve seat and gate assembly for use in a gate valve, said assembly comprising a valve body having a valve chamber therein;

a valve inlet and a valve outlet in communication with said valve chamber;

a valve gate housed in said valve chamber and arranged to move reciprocally therein in a generally vertical direction between a flow position and a stop flow position, said valve gate having a central opening;

a pair of generally ring-shaped valve seats each received in a seat pocket in said valve body on one side of said valve gate and each positioned concentrically around said valve inlet and said valve outlet, respectively, at least one of said valve seats having a central opening forming a wire-cutting surface along its inner circumferential edge, each said valve seat adapted to sealingly engage said valve gate;

at least one generally ring-shaped gate insert having a central opening therethrough and received within and contacting a generally vertical surface of an annular recess in said gate central opening, said gate insert for cutting wireline or tubing run through said valve in said flow path, said gate insert being positioned in alignment with said valve inlet and said valve outlet, thereby defining a generally horizontal flow path when said gate is in said flow position, said at least one gate insert having a wire-cutting surface formed by an inner circumferential edge; and at least one generally ring-shaped wire-cutting seat insert for cutting a wire or line run through said valve in said flow path, said seat insert being received in an insert pocket in one of said valve seats and positioned concentrically around either said valve inlet or said valve outlet, said seat insert having a central opening forming a wire-cutting surface an inner circumferential edge of said central opening of said seat insert, whereby when said valve gate is moved from said flow position to said stop-flow position, said wireline is sheared between the respective wire-cutting surfaces of said seat insert and said gate insert;

each said valve seat has an outer end in close proximity to said valve body and an inner end forming a generally vertical first plane adapted to sealingly engage said valve gate;

said gate insert has an axial length that is less than the distance between the generally vertical surface of said recess and a generally vertical plane formed by a vertical side of said gate on which said recess is formed such that the second end of said gate insert is located between said vertical surface and said generally vertical plane;

said seat insert has an axial length less than an axial length of said insert pocket such that when said insert is received in said insert pocket, said wire-cutting surface does not contact said valve gate.

34. A valve seat and gate assembly according to claim 33, wherein said gate insert is loose-fitted in said annular recess in said annular recess of said gate opening; and said valve insert is loose-fitted in said insert pocket.

35. A valve seat and gate assembly according to claim 33, wherein said wire-cutting surfaces of said seat insert and said gate insert each have, in profile, a substantially square edge.

36. A valve seat and gate assembly according to claim 33, wherein said seat insert and said gate insert are each comprised of a hardened alloy having a hardness of approximately 50 HRC or greater.

37. A valve seat and gate assembly according to claim 33, wherein said seat insert and said gate insert are each comprised of a hardened alloy having a hardness of approximately 50 to 60 HRC.

38. A valve seat and gate assembly according to claim 33, wherein said seat insert and said gate insert are each comprised of a cobalt-based alloy.

39. A valve seat and gate assembly according to claim 33, wherein said seat insert is chamfered at its circumferential edges; and said gate insert is chamfered at both ends at its circumferential edges.

* * * * *